(12) United States Patent
Brotto et al.

(10) Patent No.: US 9,166,422 B2
(45) Date of Patent: Oct. 20, 2015

(54) BATTERY BASED PORTABLE POWER SUPPLY

(75) Inventors: Daniele C. Brotto, Baltimore, MD (US); Nathan J. Cruise, Phoenix, MD (US); Erik Ekstrom, Woodstock, MD (US); Pradeep M. Pant, Cockeysville, MD (US); David A. Carrier, Aberdeen, MD (US); Shailesh P. Waikar, Parkville, MD (US); Ren Wang, Timonium, MD (US); Mehdi T. Abolhassani, Timonium, MD (US); William D. Spencer, Ellicott City, MD (US); Rouse Roby Bailey, Jr., New Park, PA (US); Andrew E. Seman, Jr., White Marsh, MD (US); John E. Buck, Cockeysville, MD (US); Seth M. Robinson, New Freedom, PA (US)

(73) Assignee: Black & Decker Inc., Newark, DE (US)

( * ) Notice: Subject to any disclaimer, the term of this patent is extended or adjusted under 35 U.S.C. 154(b) by 1807 days.

(21) Appl. No.: 12/037,290

(22) Filed: Feb. 26, 2008
(Under 37 CFR 1.47)

(65) Prior Publication Data

US 2008/0266913 A1    Oct. 30, 2008

Related U.S. Application Data

(60) Provisional application No. 60/891,540, filed on Feb. 26, 2007.

(51) Int. Cl.
*H02M 3/18*    (2006.01)
*H02J 7/00*    (2006.01)
*H02M 7/00*    (2006.01)
*H02M 7/49*    (2007.01)
*H02M 3/20*    (2006.01)

(52) U.S. Cl.
CPC ............. *H02J 7/0042* (2013.01); *H02M 7/003* (2013.01); *H02M 7/49* (2013.01); *H02J 7/0016* (2013.01)

(58) Field of Classification Search
USPC ...................................... 320/116–127; 363/60
See application file for complete search history.

(56) References Cited

U.S. PATENT DOCUMENTS

| | | | | |
|---|---|---|---|---|
| 4,554,500 A | * | 11/1985 | Sokira | 320/139 |
| 5,349,535 A | * | 9/1994 | Gupta | 702/63 |
| 5,624,003 A | | 4/1997 | Matsuki | |
| 5,963,442 A | * | 10/1999 | Yoshida et al. | 363/98 |

(Continued)

FOREIGN PATENT DOCUMENTS

| | | |
|---|---|---|
| DE | 0274644 A1 | 7/1988 |
| FR | 2862813 A1 | 5/2005 |

(Continued)

OTHER PUBLICATIONS

European Search Report.

(Continued)

*Primary Examiner* — Adolf Berhane
*Assistant Examiner* — Nusrat Quddus
(74) *Attorney, Agent, or Firm* — Michael Aronoff (57) ABSTRACT

A portable power supply includes a housing, and power circuitry providing an output AC waveform having a first positive voltage step level, a second higher positive voltage step level, a third lower positive voltage step level, a fourth negative voltage step level, a fifth higher negative voltage step level, and a sixth lower negative voltage step level.

7 Claims, 9 Drawing Sheets

(56) References Cited

U.S. PATENT DOCUMENTS

| | | | |
|---|---|---|---|
| 6,400,124 B1* | 6/2002 | Hidaka et al. | 320/145 |
| 6,753,651 B1 | 6/2004 | Goral | |
| 6,902,319 B2* | 6/2005 | Wu et al. | 374/141 |
| 6,924,567 B2* | 8/2005 | Killian et al. | 307/46 |
| 7,382,102 B2* | 6/2008 | Ashtiani | 318/139 |
| 7,592,773 B2 | 9/2009 | Pellenc | |
| 8,089,247 B2 | 1/2012 | Pellenc | |
| 2001/0043052 A1 | 11/2001 | Griffey et al. | |
| 2005/0270745 A1* | 12/2005 | Chen et al. | 361/707 |
| 2006/0097700 A1 | 5/2006 | Studyvin | |
| 2012/0179329 A1* | 7/2012 | Okamoto et al. | 701/36 |
| 2014/0015451 A1* | 1/2014 | Funabashi et al. | 318/139 |

FOREIGN PATENT DOCUMENTS

| | | |
|---|---|---|
| KR | 20050004544 A | 1/2005 |
| WO | 2005053131 A2 | 6/2005 |

OTHER PUBLICATIONS

European Search Report Apr. 16, 2015.

* cited by examiner

BATTERY BASED PORTABLE POWER SUPPLY

CROSS-REFERENCE TO RELATED APPLICATION

This application derives priority from U.S. Provisional Application No. 60/891,540, filed Feb. 26, 2007.

FIELD

This specification relates to power supplies and more specifically to portable power supplies.

BACKGROUND

There are many times in a construction jobsite where no electrical power is available. Accordingly, many construction workers rely on portable generators that can supply power to their power tools.

For most construction jobsites, it is desirable to have a generator that can supply at least about 3 kilowatts peak. Such generators typically weigh at least 120 pounds. They are also bulky and difficult to carry inside a house, forcing a user to carry such generator upstairs or use very long extension cords if the user needs to do some work inside the house.

Small portable generators are available for such situations. These generators weigh about 30 pounds, but only output about 750 watts, which is not enough to run multiple tools at a jobsite.

SUMMARY

A portable power supply including a housing, at least one battery cell, and an inverter connected to the at least one battery cell, wherein the inverter outputs at least about 3 kilowatts.

Additional features and benefits of the present invention are described, and will be apparent from, the accompanying drawings and the detailed description below.

BRIEF DESCRIPTION OF THE FIGURES

The accompanying drawings illustrate preferred embodiments according to the practical application of the principles thereof, and in which:

FIG. 3 is illustrates a second embodiment of the portable power supply according to the invention, where

FIG. 7 illustrates a third embodiment of the portable power supply according to the invention, where FIG. 7A is a block diagram of the third embodiment.

DETAILED DESCRIPTION

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
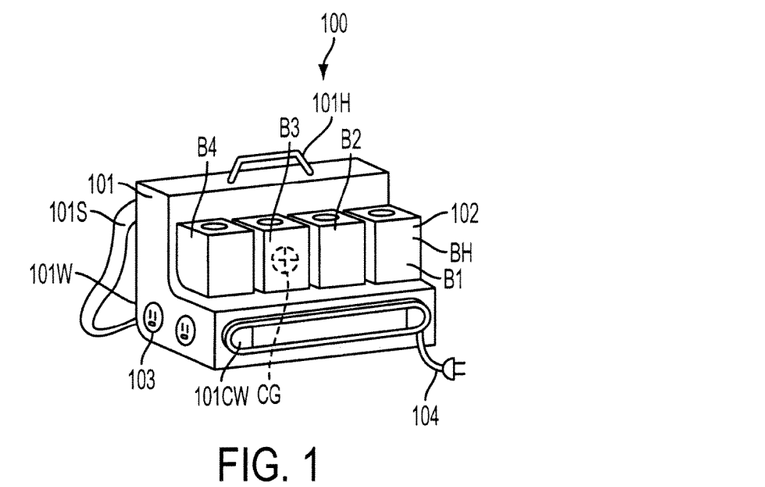
FIG. 1 is a perspective view of a first embodiment of the portable power supply according to the invention.
Figure 2:
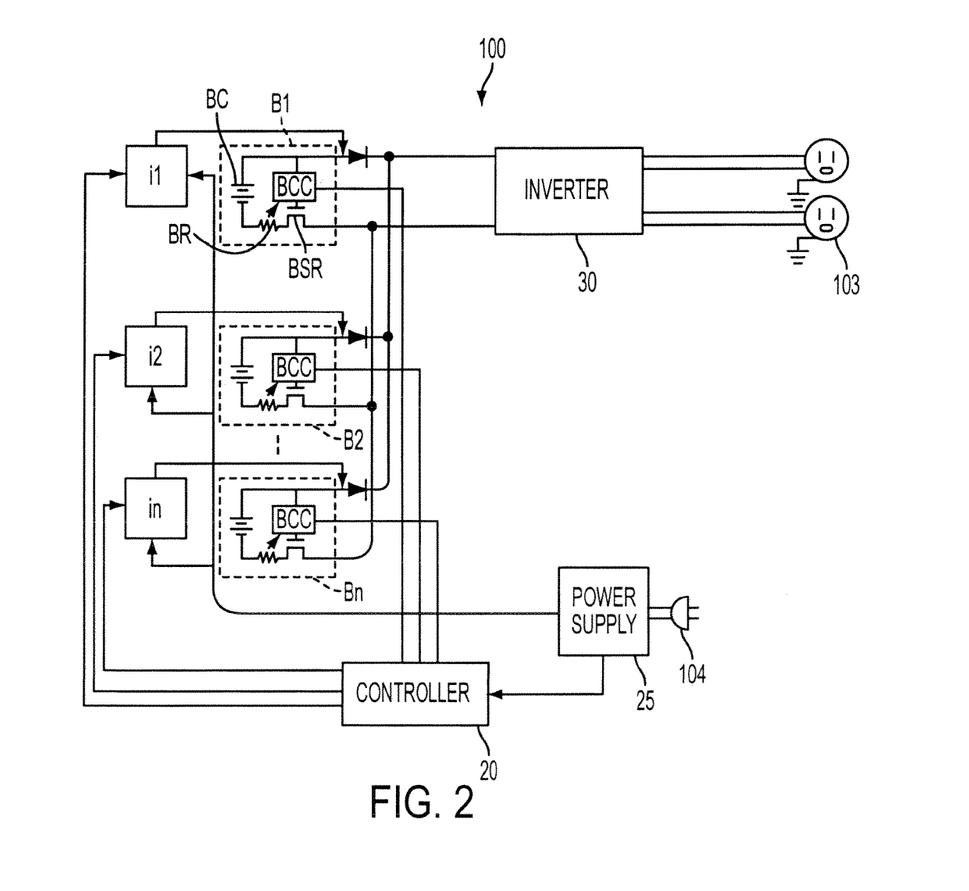
FIG. 2 is a schematic diagram of the portable power supply of FIG. 1.

In FIGS. 1-2, an exemplary portable power supply according to the present invention is designated generally by the reference numeral 100. The power supply 100 preferably includes a housing 101. The housing 101 may include a handle 101H for carrying the power supply 100. The housing 101 may have at least one and preferably two straps 101S for carrying the power supply 100.

A cable 104 may be attached to housing 101 for connecting to an AC plug. The housing 101 may have a cordwrap 101CW for wrapping the cable 104 therearound.

Housing 101 may also have outlets 103 for connecting power tools and other electric apparatuses thereto. Preferably, housing 101 will carry two or more outlets 103.

At least one battery pack 102 can be disposed on housing 101. Preferably four, five or six battery packs 102 are disposed on housing 101. Persons skilled in the art will recognize that battery pack(s) 102 may be disposed in housing 101 instead.

Persons skilled in the art will recognize that battery packs B1-Bn (and/or cells) may be connected in parallel as shown in FIG. 2, but could also be connected in series as discussed in other embodiments below. The battery packs 102 are preferably engageable with power tools. Each battery pack 102 preferably has the same components. Accordingly, the discussion as to battery pack B1 may apply to battery packs B2, B3, B4 . . . Bn as well.

Referring to FIGS. 1-2, battery pack B1 has a housing BH, at least one cell BC disposed in housing BH. Cell(s) BC may have a lead acid, nickel cadmium, nickel metal hydride or lithium ion chemistries, or a combination thereof. Preferably cell(s) BC may have a lithium ion chemistry, such as lithium phosphate, lithium manganese, etc. For example, one possible chemistry could be the chemistry disclosed in US Published Application No. 2005/0272214, which is fully hereby incorporated by reference herein.

Preferably, cells BC can output a total voltage of at least about 14 volts and preferably about 18-36 volts, and capable of providing a current of at least about 40 amps.

A switching semiconductor BSR and a current sensor or resistor BR may be disposed between an output and cell(s) BC. A battery control BCC may receive information from the current sensor BR to control the switching semiconductor BSR.

Battery control BCC may also receive other inputs from a controller 20 (and/or a microcontroller) or via other battery terminals. Battery control BCC can use such inputs (from controller 20 or other outside components, such as resistors, capacitors, etc.) to access the correct pre-programmed settings for proper operation of switching semiconductor BSR. Persons skilled in the art are referred to US Published Application Nos. 2005/0073282 and 2005/0077878, which are fully incorporated herein by reference, for further information on the components, operation and capabilities of battery pack B1. An alternate battery pack B1 may be found described in U.S. application Ser. No. 60/949,740, which is fully incorporated herein by reference.

As shown in FIG. 2, cable 104 is connected to a power supply circuit 25, which preferably provides power to controller 20. Power supply circuit 25 may convert the AC input received via cable 104 into DC power.

Power supply 25 may also provide power to current sources i1, i2, . . . in. Persons skilled in the art will recognize that each battery pack 102 can have its own current source for charging. Alternatively, several battery packs 102 may be charged by one current source, or vice versa.

Controller 20 preferably controls current sources for charging battery packs 102. Preferably controller 20 will receive voltage information of cells BC from each battery control BCC to turn on and/or off the current source feeding power (and/or reduce current) to the appropriate battery pack 102. Alternatively, battery controls BCC may instruct controller 20 to turn on and/or off the current source feeding power (and/or reduce current) to the appropriate battery pack 102. This will prevent overcharging and/or undercharging of battery pack 102.

Controller 20 also can enable battery packs 102 to discharge, providing power to inverter 30. Because battery packs B1-Bn are in series, and each battery pack can have a voltage between about 14 volts to about 36 volts (for a total voltage of at least about 100 volts to at least about 216 volts DC), it is preferable that inverter 30 be a high voltage power inverter. Persons skilled in the art will recognize that a boost circuit can be disposed between the battery packs 102 and the inverter 30 if a higher output voltage, e.g. 240 V, is desirable, less battery packs are used and/or it is not desirable to use a high voltage inverter.

Inverter 30 then outputs about 120-240 volts in AC via outlets 103. Inverter 30 may be manually or automatically controlled so that the output frequency is between about 50 and about 60 Hz. Persons skilled in the art will recognize that it may be possible to output 240VAC via outlets 103 even if the AC input is 120VAC, or vice versa. Preferably, the power output will be about at least 3 kilowatts and preferably about 5-6 kilowatts peak. Persons skilled in the art will recognize this output may be obtained and/or supplemented by the electrical power provided by current sources i1, i2, . . . in. Being that power supply 100 weighs about 30 pounds to 50 pounds, the output power-to-weight ratio will be at least 60 watts/lb, and preferably between about 100 watts/lb and about 200 watts/lb.

Accordingly, such arrangement allows the user to drive several power tools from power supply 100, whether power supply 100 was connected to an AC source. If the power supply 100 was connected to an AC source, battery packs 102 would be charged when power supply 100 was not supplying the peak power requirements. Furthermore, if the user needed to take this to a different room in the house, the user could disconnect power supply 100 from the AC source and easily carry it to the room.

Figure 3A:
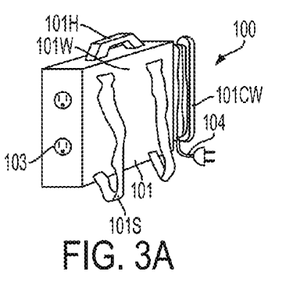
FIGS. 3A-3B are a perspective view and a side view thereof, respectively.
Figure 3B:
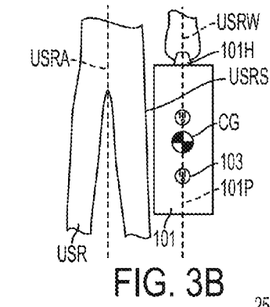
Figure 4:
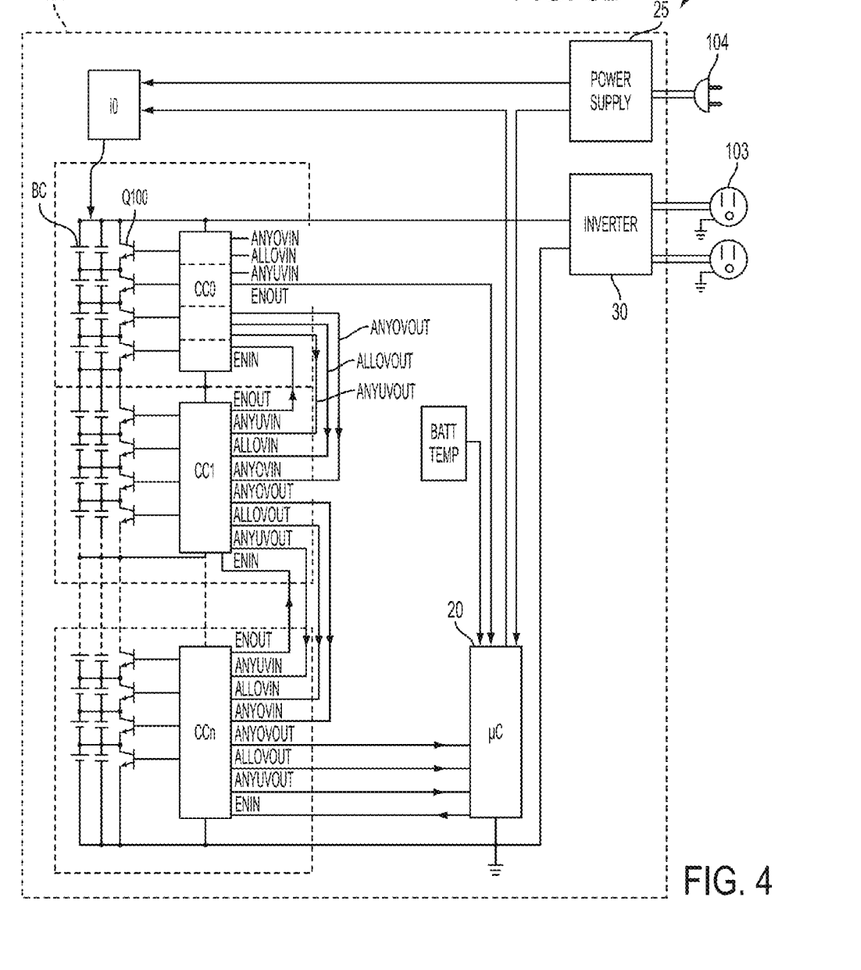
FIG. 4 is a schematic diagram of the portable power supply of FIG. 3.
Figure 5:
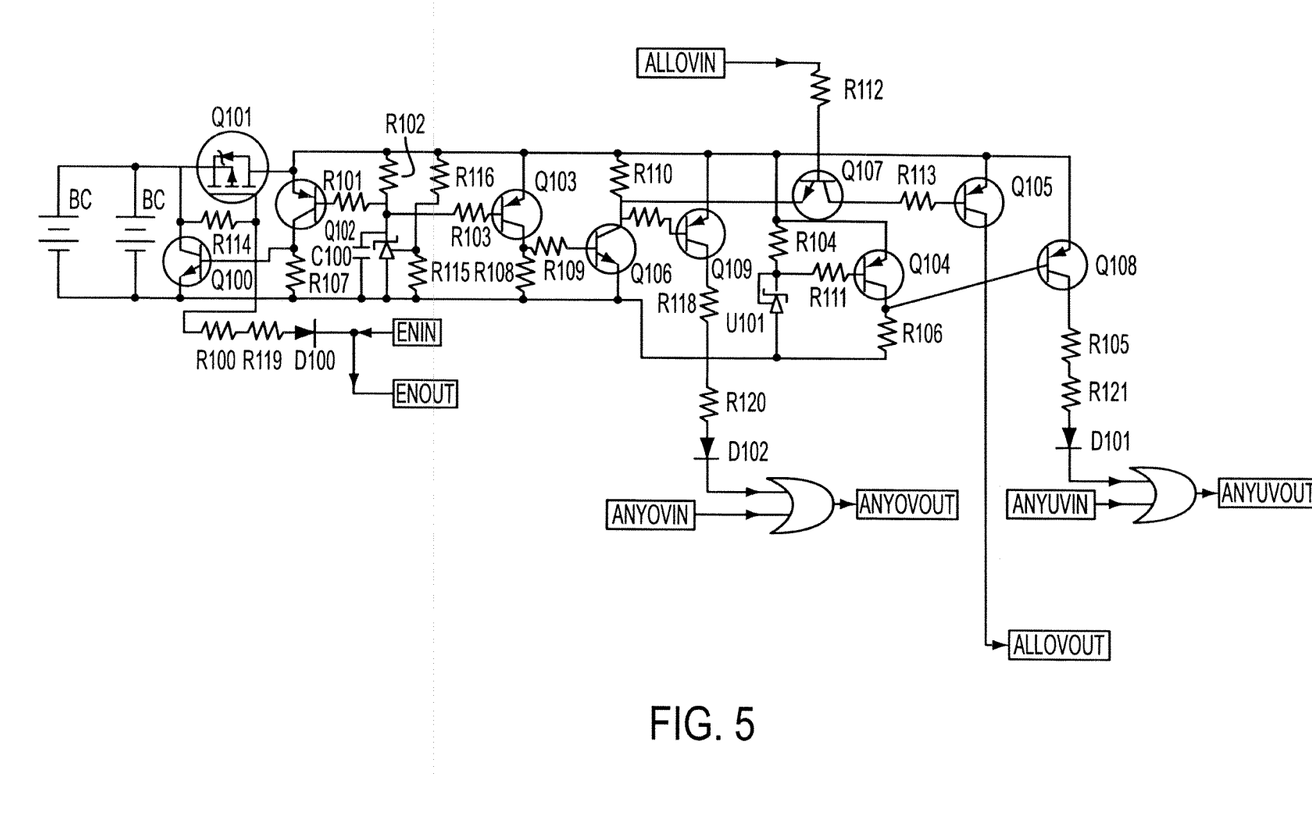
FIG. 5 is a partial schematic diagram of a cluster control circuit of FIG. 4.

A second embodiment of power supply 100 is shown in FIGS. 3-5, where like numerals refer to like parts. All the teachings of the previous embodiment are hereby incorporated.

In this embodiment, the controller or microcontroller 20 preferably controls a single current source i0. However, persons skilled in the an will recognize that multiple current sources could be used instead, as in the previous embodiment.

Furthermore, instead of battery packs 102, power supply 100 has discrete battery cells BC, preferably between 40-120 discrete battery cells. These are preferably paired up in parallel, with a transistor Q100 disposed across the cell terminals for a preferred capacity of about 288 to about 576 Watts/hour. Transistor Q100 is controlled by a cluster control CC0.

Basically, cluster control CC0 monitors the voltage across battery cells BC. As the voltage becomes too high or reaches a target, cluster control CC0 turns on transistor Q100 to shunt current through the transistor Q100, thus clamping the voltage across battery cells BC to prevent overcharging. At the same time, cluster control CC0 creates an overvoltage signal that may cause the controller 20 to lower the current being supplied by current source i0.

As seen in FIG. 4, cluster control CC0 preferably monitors at least four pairs of battery cells BC. As before, cluster control CC0 monitors the current across battery cells BC. If the voltage is too high (or the voltage reaches a predetermined target) for one pair of battery cells BC, cluster control CC0 turns on the transistor Q100 associated in parallel to such pair of battery cells BC in order to shunt current through the transistor Q100, thus clamping the voltage across battery cells BC to prevent overcharging. Persons skilled in the art are referred to another voltage clamp structure discussed in U.S. Pat. No. 4,719,401, which is hereby fully incorporated by reference.

Furthermore, cluster control CC0 creates an overvoltage signal ANYOVOUT that communicates to controller 20 that at least one battery cell is being overcharged. Such signal may cause the controller 20 to lower the current being supplied by current source i0.

If cluster control CC0 detects that all four pairs of battery cells BC are being overcharged, have reached their target voltage or are fully charged, cluster control CC0 creates an overvoltage signal ALLOVOUT that communicates to controller 20 that all associated battery cells BC have reached a predetermined target voltage.

Referring to FIG. 4, persons skilled in the art will recognize that several cluster controls CC0, CC1 . . . CCn can be used to control charging of all the battery cells BC. While each cluster control may have a signal line for signal ANYOVOUT connected to controller 20, (or connected to an OR gate which output is fed into controller 20), it may be more efficient to provide each cluster control (e.g., CC1) with an input ANYOVIN, which receives the ANYOVOUT output of the cluster control above (e.g., CC0). The cluster control receiving the output from the previous cluster control may put such input into an OR gate with its own output, resulting into the ANYOVOUT output that will be sent to the cluster control below (e.g., CC2). In this manner, controller 20 only receives one input representative of the condition where one of the battery cells BC is being overcharged.

Similarly, while each cluster control may have a signal line for signal ALLOVOUT connected to controller 20, (or connected to an AND gate which output is fed into controller 20), it may be more efficient to provide each cluster control (e.g., CC1) with an input ALLOVIN, which receives the ALLOVOUT output of the cluster control above (e.g., CC0). The cluster control receiving the output from the previous cluster control may put such input into an AND gate with its own output, resulting into the ALLOVOUT output that will be sent to the cluster control below (e.g., CC2). In this manner, controller 20 only receives one input representative of the conditions where all of the battery cells BC are being overcharged (or that all battery cells BC are fully charged). In such case, controller 20 can then turn off current source i0 and thus end charging.

As in the previous embodiment, battery cells BC provide a DC power output to inverter 30. Furthermore, as battery cells BC are discharging, controller 20 can enable current source i0 to supply power to inverter 30, in order to supplement the power input to inverter 30, as well as supply power to battery cells 20 during discharge.

During discharge, cluster controls CC0, CC1, . . . CCn preferably monitor the voltage of each pair of battery cells BC. If any cell is detected to reach a predetermined low voltage threshold, the cluster control generates an undervoltage signal ANYUVOUT. While each cluster control may have a signal line for signal ANYUVOUT connected to controller 20, (or connected to an OR gate which output is fed into controller 20), it may be more efficient to provide each cluster control (e.g., CC1) with an input ANYUVIN, which receives the ANYUVOUT output of the cluster control above (e.g., CC0). The cluster control receiving the output from the previous cluster control may put such input into an OR gate with its own output, resulting into the ANYUVOUT output that will be sent to the cluster control below (e.g., CC2). In this manner, controller 20 only receives one input representative of the condition where one of the battery cells BC is under a threshold voltage. Upon receipt of such signal, controller 20 can turn on current source i0 to charge battery cells BC (if power supply 100 is connected to an AC source). Alternatively, signal ANYUVOUT can be used to turn off the inverter 30.

Preferably, cluster controls CC0, CC1, . . . CCn are powered by battery cells BC. It is preferable to turn off cluster controls CC0, CC1, . . . CCn when not needed so as to preserve battery run-time. Controller 20 can send an ENABLE signal to each cluster control CC0, CC1, . . . CCn. However, it may be more efficient to provide each cluster control (e.g., CC1) with an input ENIN, which receives the ENABLE signal from controller 20. Such cluster control has an output ENOUT which can transmit the received ENABLE signal into the input ENIN of the cluster control above (e.g., CC0). In this manner, controller 20 only sends out one ENABLE signal across one wire, rather than across multiple wires. Microcontroller 20 can monitor ENOUT out of cluster control CC0 to confirm that all cluster controls have become enabled.

FIG. 5 is a circuit schematic for a part of a cluster control CC0. Persons skilled in the art will recognize that such circuitry is stackable depending upon how many pairs of battery cells BC are to be monitored. In other words, for the embodiment shown in FIG. 4, the circuit schematic of FIG. 5 would be repeated four times, one circuit per pair of battery cells BC.

The following table provides values for each component shown in FIG. 5:

| | |
|---|---|
| C100 | C-0805 |
| D100 | D-BAS20 |
| D101 | D-BAS20 |
| D102 | D-BAS20 |
| Q100 | Q-TIP41 |
| Q101 | Q-BSS84 |
| Q101 | LMV431 |
| Q102 | Q-MMBT3906 |
| Q103 | Q-MMBT3906 |
| Q104 | Q-MMBT3906 |
| Q105 | Q-MMBT3906 |
| Q106 | Q-MMBT3904 |
| Q107 | Q-MMBT3904 |
| Q108 | Q-MMBTA92 |
| Q109 | Q-MMBTA92 |
| R100 | 1 kiloohms |
| R101 | 1 kiloohms |
| R102 | 1 kiloohms |
| R103 | 1 kiloohms |
| R104 | 1 kiloohms |
| R105 | 1 kiloohms |
| R106 | 10 kiloohms |
| R107 | 10 kiloohms |
| R108 | 10 kiloohms |
| R109 | 10 kiloohms |
| R110 | 10 kiloohms |
| R111 | 10 kiloohms |
| R112 | 10 kiloohms |
| R113 | 10 kiloohms |
| R114 | 100 kiloohms |
| R115 | 2.15 kiloohms, 1% |
| R116 | 1.00 kiloohms, 1% |
| R117 | 10 kiloohms |
| R118 | 1 kiloohms |
| R119 | 1 kiloohms |
| R120 | 1 kiloohms |
| R121 | 1 kiloohms |
| U100 | TL431 |

Figures 6, 8:
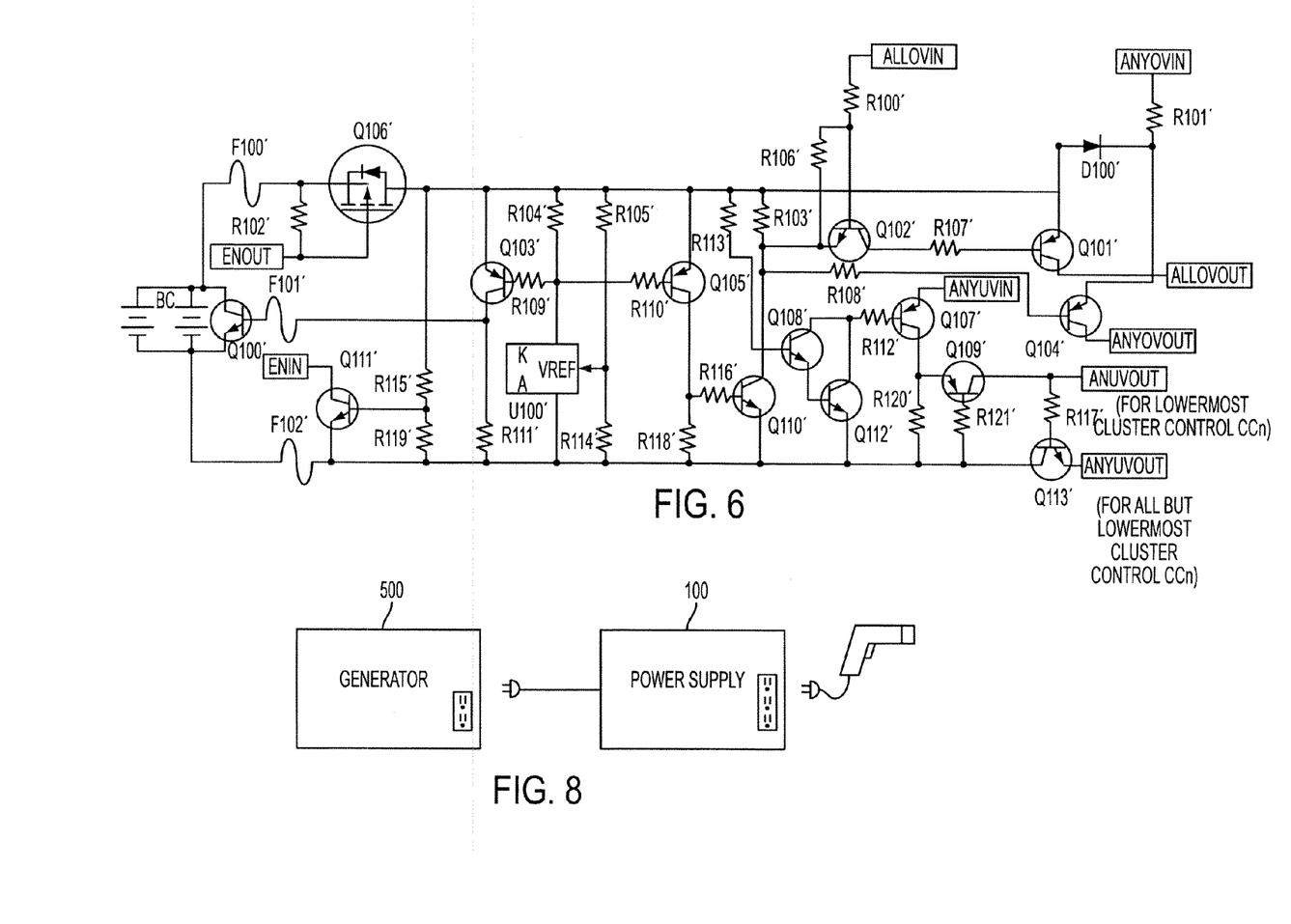
FIG. 6 is a partial schematic diagram of an alternative cluster control circuit of FIG. 4.
FIG. 8 is a portable power supply/generator combination according to the invention.

FIG. 6 is an alternative circuit schematic for a part of a cluster control CC0. Persons skilled in the art will recognize that such circuitry is stackable depending upon how many pairs of battery cells BC are to be monitored. In other words, for the embodiment shown in FIG. 4, the circuit schematic of FIG. 6 would be repeated four times, one circuit per pair of battery cells BC.

The following table provides values for each component shown in FIG. 6:

| | |
|---|---|
| D100' | BAS16 |
| F100' | ¼ Amp |
| F101' | ¼ Amp |
| F102' | ¼ Amp |
| Q100' | D44H8 |
| Q101' | MMBT3906 |
| Q102' | MMBT3904 |
| Q103' | MMBT 3906 |
| Q104' | MMBT3906 |
| Q105' | MMBT3906 |
| Q106' | NTR2101 |
| Q107' | MMBT3906 |
| Q108' | MMBT3904 |
| Q109' | MMBT3906 |
| Q110' | MMBT3904 |
| Q111' | MMBT3904 |
| Q112' | MMBT3904 |
| Q113' | MMBT3904 |
| R100' | 10 kiloohms |
| R101' | 1 kiloohm |
| R102' | 100 kiloohms |
| R103' | 10 kiloohms |
| R104' | 1 kiloohm |
| R105' | 1.00 kiloohm |
| R106' | 10 kiloohms |
| R107' | 10 kiloohms |
| R108' | 1 kiloohm |
| R109' | 1 kiloohm |
| R110' | 1 kiloohm |
| R111' | 10 kiloohms |
| R112' | 100 kiloohms |
| R113' | 100 kiloohms |
| R114' | 2.15 kiloohms |
| R115' | 10 kiloohms |
| R116' | 10 kiloohms |
| R117' | 10 kiloohms |
| R118' | 10 kiloohms |
| R119' | 100 kiloohms |
| R120' | 100 kiloohms |
| R121' | 100 kiloohms |
| U100' | TL431CPK |

Persons skilled in the art will recognize that using cluster controls rather than one single control for all battery cells will allow the use of cheaper lower voltage electronics, whereas a single control may require the use of more expensive high voltage electronics that can handle the entire voltage range of the battery cells BC. Furthermore, persons skilled in the art will recognize that cluster control CC0 may be integrated into an application specific integrated circuit (ASIC).

Figures 7A, 7D:
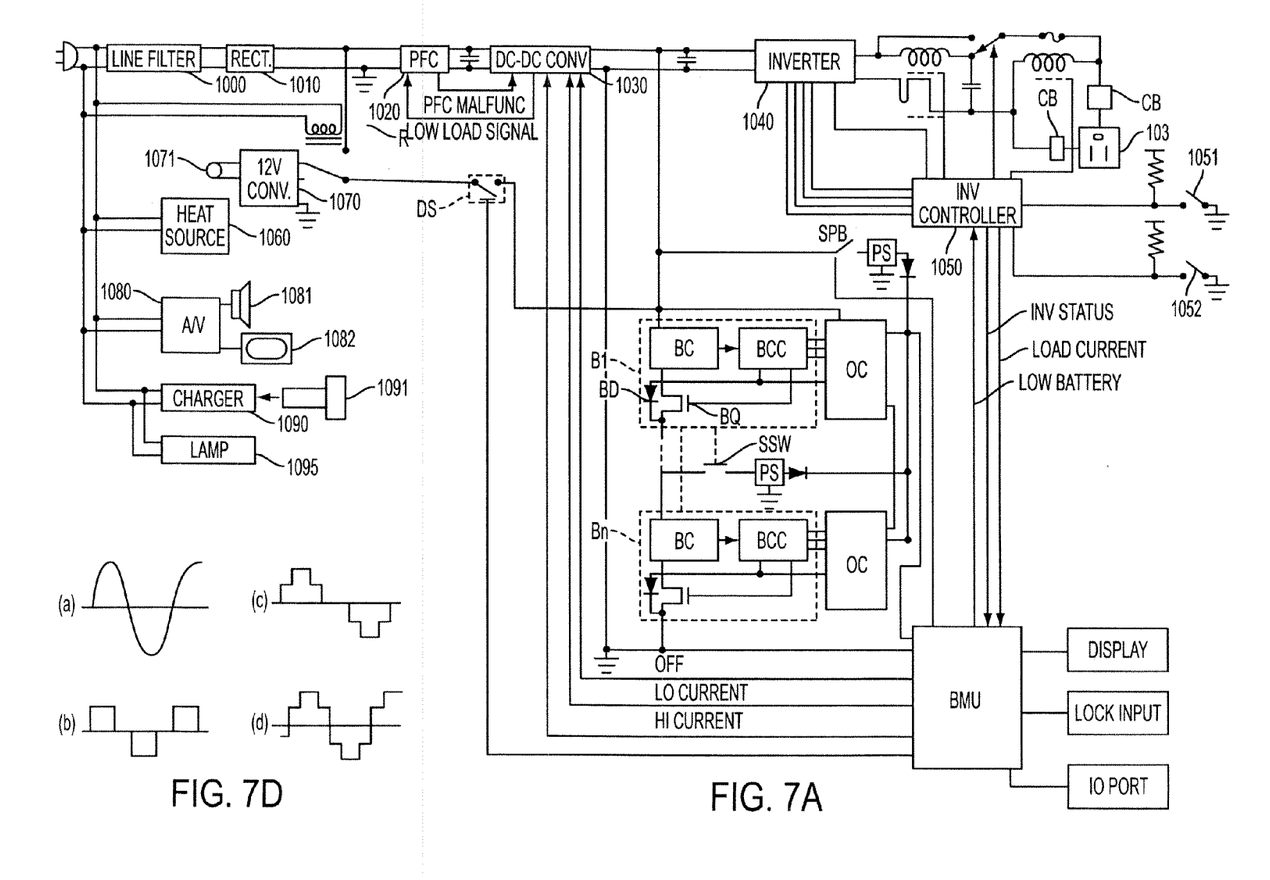
Figure 7B:
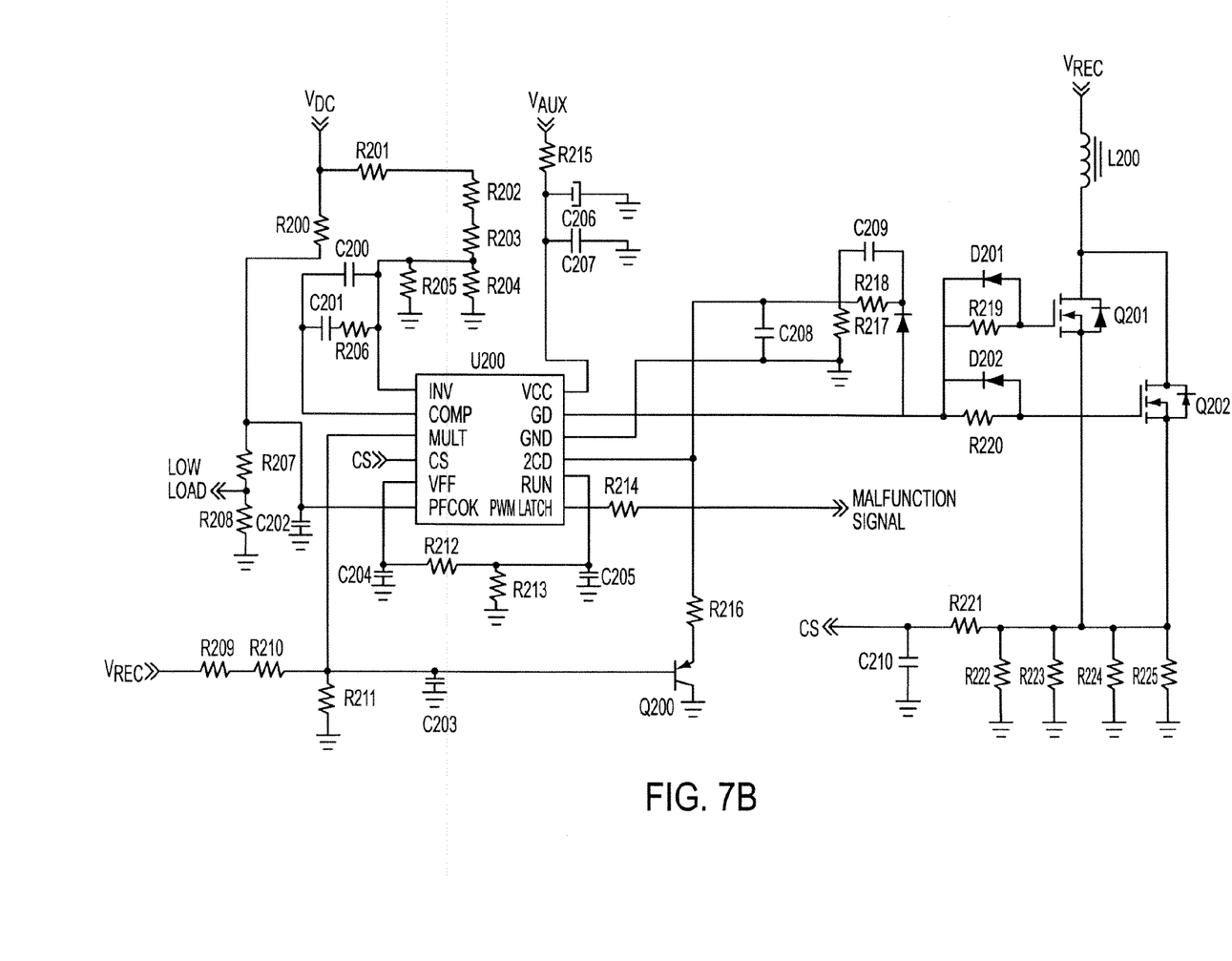
FIG. 7B is a schematic diagram of the PFC 1020.

A third embodiment of the power supply is shown in FIG. 7, where like numerals refer to like parts. Referring to FIG. 7A, the power supply 100 preferably has a line filter 1000, a rectifier 1010 and a power factor/boost converter (PFC) 1020. The PFC 1020 is preferably a controllable buck converter to boost power as necessary. A schematic diagram of PFC 1020 is shown in FIG. 7B. The following table provides values for each component shown in FIG. 7B:

| | |
|---|---|
| C200 | 100 nanofarads |
| C201 | 1 microfarads |
| C202 | 10 nanofarads |
| C203 | 10 nanofarads |
| C204 | 470 nanofarads |
| C205 | 2.2 nanofarads |
| C206 | 10 microfarads/50 volts |
| C207 | 100 nanofarads |
| C208 | 220 picofarads |
| C209 | 100 picofarads |
| C210 | 330 picofarads |
| D200 | LL4148 |
| D201 | LL4148 |
| D202 | LL4148 |
| L200 | 500 microhenries |
| Q200 | BC8570 |
| Q201 | STP12NM50FP |
| Q202 | STP12NM50FP |
| R200 | 6.6 megaohm |
| R201 | 880 kiloohms |
| R202 | 680 kiloohms |
| R203 | 680 kiloohms |
| R204 | 15 kiloohms |
| R205 | 100 kiloohms |
| R206 | 56 kiloohms |
| R207 | 5.1 kiloohms |
| R208 | 30 kiloohms |
| R209 | 820 kiloohms |
| R210 | 820 kiloohms |
| R211 | 10 kiloohms |
| R212 | 150 kiloohms |
| R213 | 240 kiloohms |
| R214 | 1.0 kiloohms |
| R215 | 47 kiloohms |
| R216 | 1.5 kiloohms |
| R217 | 15 kiloohms |
| R218 | 3.3 kiloohms |
| R219 | 6.8 ohms |
| R220 | 6.8 ohms |
| R221 | 1.0 kiloohms |
| R222 | 0.39 ohms |
| R223 | 0.39 ohms |
| R224 | 0.39 ohms |
| R225 | 0.39 ohms |
| U200 | L6563 |

The output of the PFC 1020 goes into an isolated DC-DC converter 1030 that can provide constant current output. The output of the converter 1030 can charge battery packs B1, . . . Bn, and/or provide power to an inverter 1040.

Inverter 1040 is preferably a non-isolated full-bridge DC-AC inverter. The inverter 1040 preferably can run at least one of four output waves: a pure sinewave (shown in FIG. 7D(a)), an AC pulse (shown in FIG. 7D(b)), a modified AC pulse (shown in FIG. 7D(c)) and a modified sinewave (shown in FIG. 7D(d)).

Persons skilled in the art will recognize that the modified sinewave of FIG. 7D(d) may provide more power than the pure sinewave having the same amplitude, while still providing a recognizable zero crossing. This modified sinewave over time preferably has a first positive voltage step level, a second higher positive voltage step level, a third lower positive voltage step level (which could be at the same level as the first voltage step level), a fourth negative voltage step level (with very little time between the transition from the third and fourth voltage step levels and/or at 0V), a fifth higher negative voltage step level, and a sixth lower negative voltage step level (which could be at the same level as the fourth voltage step level). The pattern is then repeated with very little time between the transition from the sixth and first voltage step levels and/or at 0V. Persons skilled in the art will recognize that, following this pattern, the amount of time spent at 0V is very small or negligible, e.g., less than 10-25 microseconds. (Persons skilled in the art will recognize that other power supplies, such as generators, can be design to output such waveform.) Persons skilled in the art will recognize that, at each step level, the voltage will preferably be substantially constant.

Figure 7C:
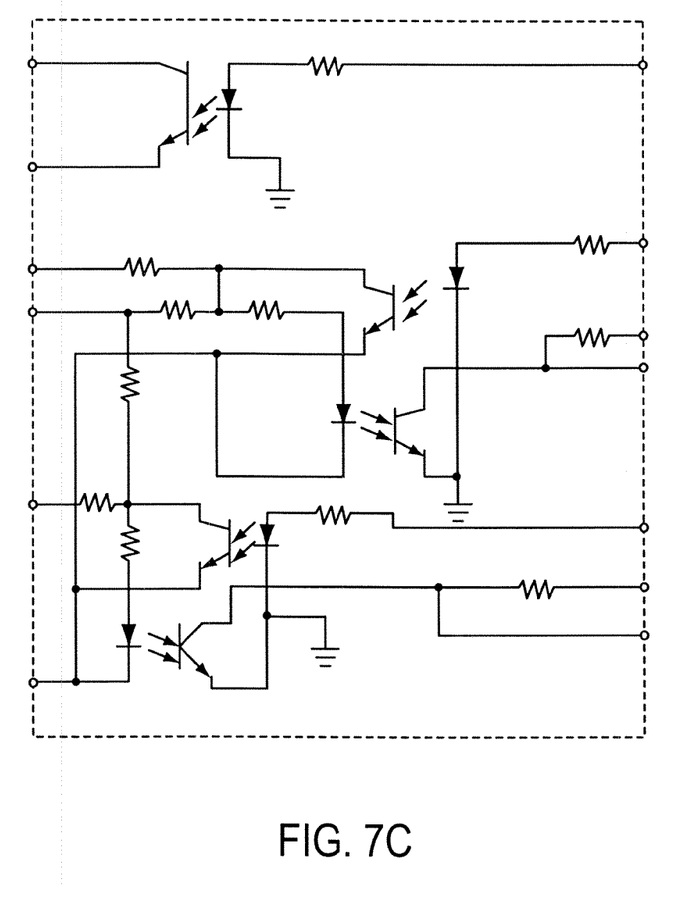
FIG. 7C is a schematic diagram of the optocoupling, FIG. 7D show four preferable output waves.
Figure 7E:
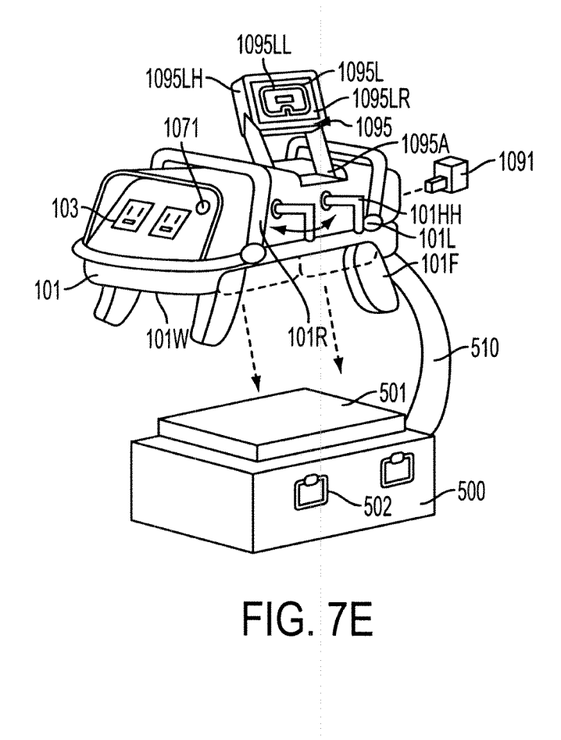
FIG. 7E is a perspective view of the power supply.
Figure 7F:
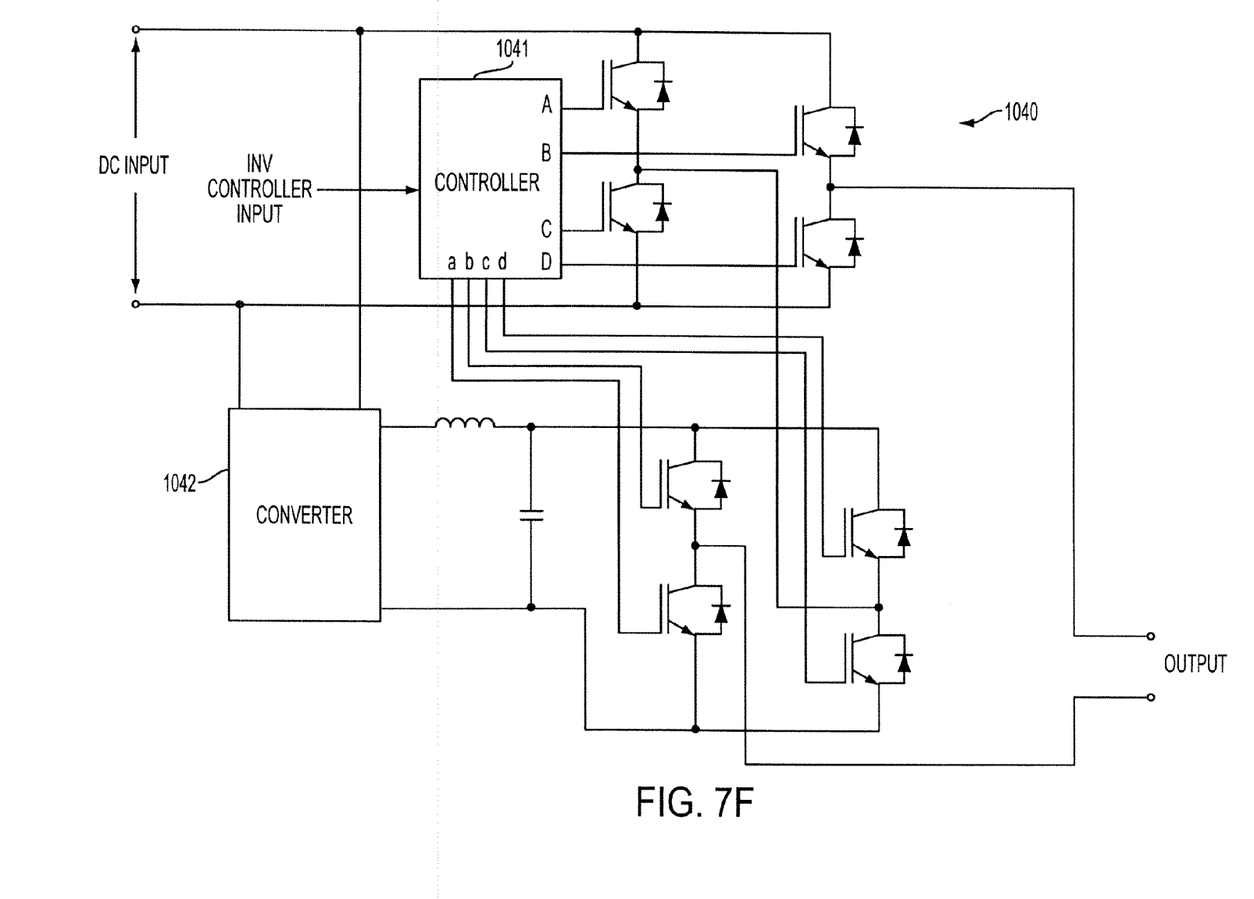
FIG. 7F is a schematic diagram of the inverter output circuitry.

FIG. 7F shows a schematic of inverter 1040 that can be used to obtain different output waveforms which may or may not include all of the waveforms shown in FIG. 7D. Inverter 1040 may include an isolated step-down DC/DC converter with a voltage controlled output 1042.

Preferably inverter 1040 has a controller 1041 which receives inputs from the inverter controller 1050 and/or the battery management unit BMU. Controller 1041 then switches the different transistors that are connected to the DC input and/or to the output of converter 1042 as shown in FIG. 7F. Controller 1041 would preferably switch the transistors in a specific order to create the desired output wave.

Persons skilled in the art will recognize that the transistors shown in FIG. 7F are preferably insulated-gate bipolar transistors (IGBTs).

As shown in FIG. 7A, some circuitry is disposed between inverter 1040 and outlet(s) 103. This circuitry can help in shaping the output sinewave, provide current output information to inverter controller 1050 and/or battery management unit BMU, and/or stop current flow via a standard and/or thermal circuit breaker(s) CB.

Inverter 1040 is preferably controlled by the inverter controller 1050. Inverter controller 1050 receives inputs from output on/off switch 1051 and wave selection switch 1052. According to these inputs, inverter controller 1050 would activate several lines for switching bridge switches inside inverter 1040 to provide the desired wave output.

The inverter controller 1050 is also in communication with the battery management unit BMU, providing information as to whether the inverter is on or off, if a load is connected to the inverter, etc. Based on this information, as well as the state of charge of the batteries, the battery management unit BMU can turn off the DC-DC converter 1030, request a low current output, or request a high current output. For example, if the battery packs can handle the entire inverter current draw, the battery management unit BMU may turn off the DC-DC convener 1030. On the other hand, if the batteries are not charged enough, but the load connected to inverter 1040 is not too large, the battery management unit BMU may request a high current output. The DC-DC converter 1030 may in turn send a low load signal to the PFC 1020 so that the PFC 1020 does not boost its output or is turned off.

The DC-DC converter 1030 may also provide the high current output to charge battery packs B1-Bn. The DC-DC converter 1030 may also provide a low current output to balance battery packs B1-Bn. These current output settings would be selected by the battery management unit BMU.

If the PFC 1020 malfunctions, it can send a malfunction signal to DC-DC converter 1030, preferably shutting down DC-DC converter 1030.

Referring to FIG. 7A, battery packs B1-Bn are preferably connected in series. The battery packs B1-Bn preferably have cells BC, electronics BCC, a power transistor or triac BQ disposed in series with cells BC, and a diode BD disposed across triac BQ.

Preferably, the quantity and voltages of these battery packs are selected so that the combined voltage will be more than 170VDC, to meet the peak voltage of 120V single phase AC. In particular, six 36V battery packs may be provided.

Each battery pack is preferably connected to the battery management unit BMU via an optocoupling isolator OC. A schematic diagram of such optocoupling isolator OC is shown in FIG. 7C. Persons skilled in the art will recognize that providing such optocoupling isolator OC will allow battery management unit BMU to handle the different varying voltages in battery packs B1-Bn.

Typically, the battery management unit BMU is normally disconnected from battery packs B1-Bn and connected only after the start switch SSW is pressed. When start switch SSW is pressed, power supply PS provides a signal to battery management unit BMU, after which the battery management unit BMU sends a signal to switch SPB, closing such switch SPB so that battery management unit BMU receives power from another power supply PS.

Persons skilled in the art will recognize that, if power supply 100 is connected to an AC source, battery management unit BMU will always be powered on without requiring any input at start switch SSW.

Battery management unit BMU may have a display connected thereto to provide information to the user, such as how much power remains in power supply 100. Other information that could be displayed include but are not limited to battery diagnostics, power supply 100 diagnostics, etc.

Battery management unit BMU may have an input/output port. This input/outport port can be used to connect the battery management unit BMU to a computer or reader apparatus. With such connection, information collected or stored in the battery management unit BMU can be downloaded to and/or accessed by the computer or reader apparatus for later and/or real-time analysis of the functioning of power supply 100. Persons skilled in the art will recognize that such connection may also allow programming or reprogramming of the software controlling the battery management unit BMU and/or the battery packs B1-Bn. Persons skilled in the art will recognize that the input/output port may be an infrared port, a USB port, a serial port, optoelectronics port, a parallel port, and/or an RF (radio frequency) communicator.

Battery management BMU may receive inputs from locking modules, such as a keylock, a key fob, fingerprint reader, key pad, etc., that maintains the power supply 100 in a locked unusable status until the proper input is provided.

It may be preferable to provide a heat source 1060, such as heat tape or blankets, adjacent to battery packs B1-Bn to warm up the battery packs B1-Bn. Such warming up operation may allow the battery packs to be used in a low temperature, e.g., below zero degrees Celsius. Alternatively, battery packs B1-Bn may be warmed by the exhaust of a gas engine, such as the exhaust of a gas-engine compressor or generator 500 (as shown in FIG. 7E). A hose 510 may be used to duct the exhaust gases from generator 500 to power supply 100.

Because of the high energy density of the power supply 100 it is possible to combine power supply 100 with a low weight generator 500 and still provide an output usable in a jobsite, as shown in FIG. 8. This is because generator 500 does not need to output enough power for the jobsite—just enough to charge battery packs B1-Bn.

For example, power supply 100 may weigh about 30 pounds to 50 pounds, and preferably weighs about 35 pounds. Such power supply 100 may output about 6000 watts max and about 700 watts constant. If such power supply 100 were combined with a Honda EU1000i generator (a 1000 watt generator), the combined weight will be about 64 pounds dry weight (or 67.5 pounds with 0.5 gallon of gas, i.e., wet weight), making this combination very manageable to carry around in a jobsite. Such combination will output about 93.8 watts per pound (dry weight) and 89 watts per pound (wet weight). By contrast, the Honda EB5000i (a 5000 watt max generator) would weigh about 198 pounds (thus outputting about 25.3 watts per pound). Similarly, the Honda EB7000i (a 6500 watt max generator) would weight about 198 pounds (thus outputting about 32.8 watts per pound).

Persons skilled in the art will recognize that it is preferable that the generator and power supply 100 combination will preferably output at least 5000-6000 watts at at least 48 watts per pound and preferably at least 60 watts per pound.

Because of the low power required to charge battery packs B1-Bn, users can select less expensive power sources to charge power supply 100. For example, users can use a smaller, less expensive generator that, for example, uses a Stirling engine or fuel cells, than a larger generator using the same technology, e.g., a Stirling engine or fuel cells which outputs 6 kilowatts. Because the larger more expensive generator is no longer needed, the price-to-watts ratio is substantially lowered.

Referring to FIG. 7E, it may be preferable for generator 500 to have at least one protrusion 501 to receiving the power supply 100. Protrusion(s) 501 would preferably engage a feature in housing 101 so that power supply 100 cannot be moved horizontally relative to generator 500, only lifted therefrom. Persons skilled in the art will recognize that protrusion(s) 501 may be disposed on housing 101 to engage a feature in generator 500.

Persons skilled in the art will recognize that it is preferable that similar protrusion(s) or features are disposed on the top of power supply 100, allowing multiple power supplies 100 to be stacked.

Generator 500 may also have latches 502 for fixedly attaching power supply 100 to generator 500. Latches 502 may engage a feature 101L on roll cage 101R and/or housing 101, so that the power supply 100 cannot be lifted off generator 500. Persons skilled in the art will recognize that latches 502 may also be used to attach lamps and/or other accessories to generator 500.

Persons skilled in the art will recognize that latches 502 may be disposed on housing 101 and/or roll cage 101R to engage a feature 101L on generator 500. In such case, latches 502 may also be used to attach lamps and/or other accessories to power supply 100.

Figure 9:
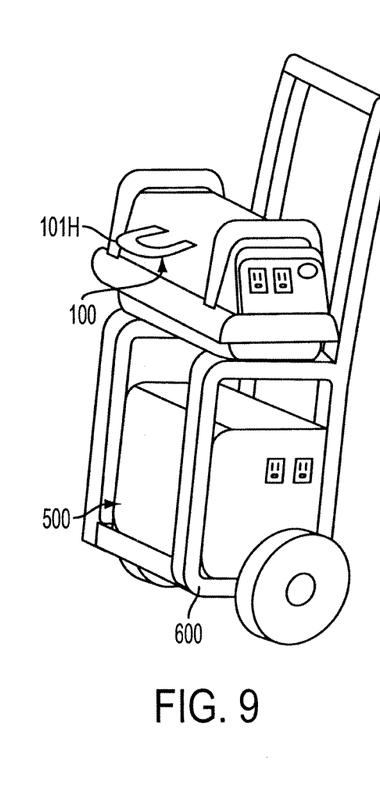
FIG. 9 is an alternate method for transporting the portable power supply

FIG. 9 illustrates another method for transporting power supply 100 and generator 500. Power supply 100 and/or generator 500 may be attached to a dolly 600. Power supply 100 may have hooks 101HH on housing 101, allowing power supply 100 to be hooked onto a beam (not shown) of dolly 600. Persons skilled in the art will recognize that hooks 101HH are preferably rotatable so they may be rotated to be flat against housing 101 when not in use. Springs (not shown) attached to hooks 101HH may be provided to bias hooks 101HH towards housing 101.

Referring to FIGS. 7A and 7E, it may be preferable to provide power supply 100 with a 12V DC output. Persons skilled in the art will recognize that this could be done by providing an alternate power path with a step-down transformer and rectifier, or a separate 12V DC converter 1070 could be provided after the rectified output, as shown in FIG. 7A. Persons skilled in the art will recognize that the 12V DC converter 1070 may derive power from the battery packs B1-Bn.

As shown in FIG. 7A, a relay or a semiconductor switch R may be used to switch between powering the 12V DC converter from AC power (when power supply 100 is plugged into an AC source) or battery packs B1-Bn. The output of the DC converter 1070 can be provided to a cigarette lighter-type outlet 1071.

A switch or semiconductor switch DS may be disposed between switch R and the battery packs B1-Bn. Such switch DS is preferably controlled by battery management unit BMU. If battery management unit BMU detects that battery packs B1-Bn are not charged enough to power DC converter 1070, it may open switch DS to prevent the overdischarge of battery packs B1-Bn.

Persons skilled in the art should also recognize that other converters may be used to obtain different voltages. For example, an alternate converter 1070 may provide an output about 5 volts. Preferably, the output of the DC converter 1070 can be provided to an USB outlet.

It may also be preferable to provide power supply 100 with an audio and/or visual circuit 1080, which can provide audio output through speaker(s) 1081 and/or video output through display 1082. Such audio and/or visual circuit 1080 may include a radio, a CD player, an MP3 player, and/or a DVD player. Preferably, audio and/or visual circuit 1080 may include an auxiliary input to plug in other sources of audio and/or video input, such as an iPod®, a hand-held DVD player, a video game, etc. As before, audio and/or visual circuit 1080 may be powered from the AC mains line, the output of rectifier 1010 and/or the battery packs B1-Bn. The power source may be selected manually by the user, or automatically via circuitry, such as switch R, etc. As before, a switch DS may be disposed between switch R and the battery packs B1-Bn and controlled by battery management unit BMU to prevent overdischarge of battery packs B1-Bn.

It may also be preferable to provide power supply 100 with a charger 1090 for charging power tool battery packs 1091. As before, charger 1090 may be powered from the AC mains line, the output of rectifier 1010 and/or the battery packs B1-Bn. The power source may be selected manually by the user, or automatically via circuitry, such as switch R, etc. As before, a switch DS may be disposed between switch R and the battery packs B1-Bn and controlled by battery management unit BMU to prevent overdischarge of battery packs B1-Bn.

It may also be preferable to provide power supply 100 with a lamp 1095, as shown in FIGS. 7A and 7E. As before, lamp 1095 may be powered from the AC mains line, the output of rectifier 1010 and/or the battery packs B1-Bn. The power source may be selected manually by the user, or automatically via circuitry, such as switch R, etc. As before, a switch DS may be disposed between switch R and the battery packs B1-Bn and controlled by battery management unit BMU to prevent overdischarge of battery packs B1-Bn.

Lamp 1095 preferably includes a light assembly 1095L movably connected to housing 101 via arms 1095A. Light assembly 1095L preferably comprises a light housing 1095LH, which may support supports a reflector 1095LR and a lamp bulb 1095LL. Lamp bulb 1095LL may be a light bulb, a halogen bulb, a fluorescent tube, light emitting diodes, etc. Preferably lamp bulb 1095LL is a double-D shaped fluorescent tube, rated at about 38 watts. Persons skilled in the art are referred to U.S. application Ser. No. 11/559,002, filed Nov. 13, 2006, entitled "BATTERY CHARGING WORK LIGHT," which is hereby wholly incorporated by reference, for further information.

Housing 101 may have bars 101R forming a roll cage disposed there housing 101 to protect housing 101. Bars 101R may be made of plastic or metal, and may be flexibly connected to housing 101, as is show in U.S. Pat. No. 6,427,070, which is hereby wholly incorporated by reference.

Housing 101 may also have legs 101F. Preferably legs 101F are rotatably attached to housing 101 so they may be moved between a collapsed storage position to an extended use position. Persons skilled in the art will recognize that it is preferable to design legs 101F of a certain length so that housing 101 can be disposed above mud and/or standing water if power supply 100 is disposed on a construction jobsite ground.

Referring to FIGS. 1 and 3, it is preferable that the center of gravity CG of power supply 100 is disposed substantially underneath handle 101H. This provides for a unit that is well-balanced during transportation. Preferably, center of gravity CG will be disposed in a plane 101P that includes the centerline of handle 101H. Plane 101P is preferably located in a substantially vertical orientation that is generally parallel to a vertical (longitudinal) axis USRA of a user USR.

It is preferable that the plane 101P be selected so that it is relatively close to rear wall 101W. The user USR may then be able to transport power supply 100 such that the rear wall 101W is proximate to a lateral side USRS of the user USR (i.e., within about 10 inches of the lateral side USRS, and preferably about 3 inches to about 7 inches), and the user's wrist USRW is not in a state of flexion.

With such arrangement, the user USR may be able to comfortably carry the power supply 100, as well as to easily pivot the power supply 100 between the substantially vertical transport position and a position where the housing 101 is disposed on rear wall 101W. Power supply 100 may be used in this orientation, ensuring stability during operation or transport, and minimizing jostling or tipping over of the unit.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A portable power supply comprising:
 a housing;
 a current source disposed in the housing;
 a first battery cell connected to the current source;
 a third battery cell connected in parallel to the first battery cell;
 a first transistor connected in parallel to the first battery cell;
 a second battery cell connected in series to the first battery cell;
 a second transistor connected in parallel to the second battery cell;
 a first local controller connected to the first and second transistors for controlling the first and second transistors; and
 an inverter connected to the first and second battery cells.

2. The portable power supply of claim 1, further comprising a fourth battery cell connected in parallel to the second battery cell.

3. A portable power supply comprising:
a housing;
a current source disposed in the housing;
a first battery cell connected to the current source;
a first transistor connected in parallel to the first battery cell;
a second battery cell connected in series to the first battery cell;
a second transistor connected in parallel to the second battery cell;
a third battery cell connected in series to the second battery cell;
a third transistor connected in parallel to the third battery cell;
a fourth battery cell connected in series to the third battery cell;
a fourth transistor connected in parallel to the fourth battery cell;
a first local controller connected to the first and second transistors for controlling the first and second transistors; and
an inverter connected to the first and second battery cells.

4. The portable power supply of claim 3, further comprising a second local controller connected to the third and fourth transistors for controlling the third and fourth transistors.

5. The portable power supply of claim 4, further comprising a controller connected to at least one of the first and second local controllers for receiving information from at least one of the first and second local controllers.

6. The portable power supply of claim 5, wherein the controller controls the current source partly based on the information received from the at least one of the first and second local controllers.

7. The portable power supply of claim 1, further comprising a controller connected to the first local controller and to the current source for receiving information from the first local controller, and for controlling the current source partly based on the information received from the first local controller.

* * * * *